United States Patent

Hall

[15] 3,680,224
[45] Aug. 1, 1972

[54] TEACHING SYSTEM

[72] Inventor: Wendell H. Hall, 3015 Cherokee, Provo, Utah 84601

[22] Filed: May 13, 1970

[21] Appl. No.: 36,835

[52] U.S. Cl. .................................................35/9 E
[51] Int. Cl. ..............................................G09b 3/00
[58] Field of Search .........35/8 R, 8 A, 9 R, 9 A, 9 B, 35/9 E, 9 F, 9 H, 35 B; 353/88, 91, 92

[56] References Cited

UNITED STATES PATENTS

| | | | |
|---|---|---|---|
| 2,178,906 | 11/1939 | Haumerson | 35/9 B X |
| 3,103,750 | 9/1963 | Werner | 35/9 B |
| 3,162,959 | 12/1964 | Woolman | 35/9 E |
| 3,266,172 | 8/1966 | Heinberg | 35/8 R |
| 3,281,960 | 11/1966 | Gross | 35/9 H |
| 3,221,420 | 12/1965 | Heinberg | 35/8 A X |
| 3,477,142 | 11/1969 | Cornell et al. | 35/9 A |

*Primary Examiner*—Wm. H. Grieb
*Attorney*—Lynn G. Foster

[57] ABSTRACT

A light transmitting window upon which is superimposed a translucent template having various normally obscured information for use in teaching and a lamp assembly projecting a light beam which is selectively positionable relative to the window. The lamp assembly may have a plurality of separate compartments each of which can be provided with independently actuated lamps to illuminate only a segment of the window, the segment having a configuration corresponding to a single body of information on the template so that the body of information is made visible by the illumination. Alternatively, the lamp may remain stationary and a movable shutter assembly used to direct a light beam of selected configuration to various locations on the window. Instructions, questions and other information is made audibly available with an audio recording apparatus. A method of teaching includes illuminating a portion of the template to reveal a question or the like allowing a student to respond by selecting from among alternative answers and, thereafter, illuminating another portion of the template to reveal the most appropriate of the alternative answers or comments on the selected answer. An alternative method includes first audibly communicating questions or information to the student.

7 Claims, 20 Drawing Figures

PATENTED AUG 1 1972 3,680,224

INVENTOR.
WENDELL H. HALL
BY
ATTORNEY

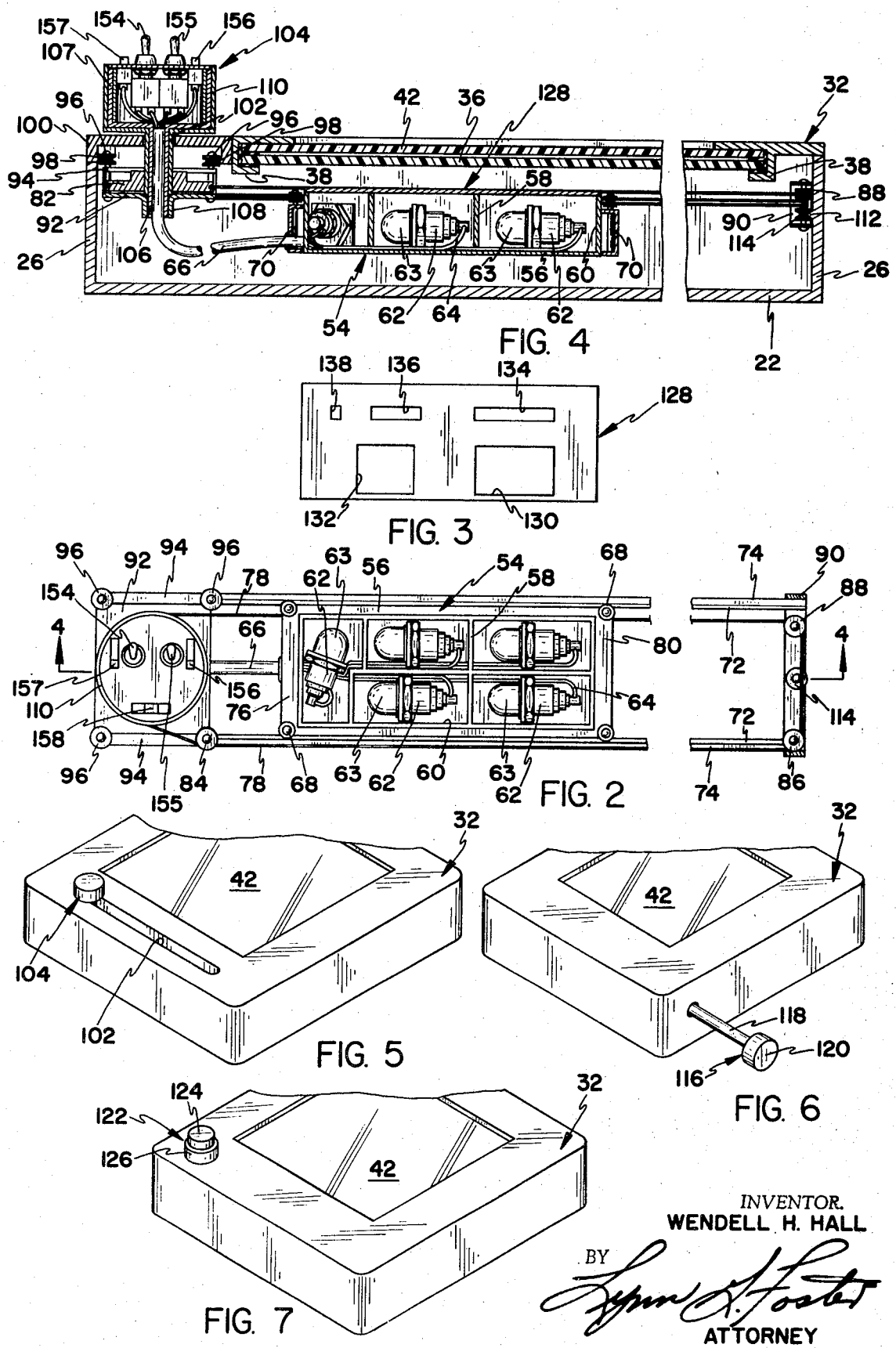

INVENTOR.
WENDELL H. HALL
ATTORNEY

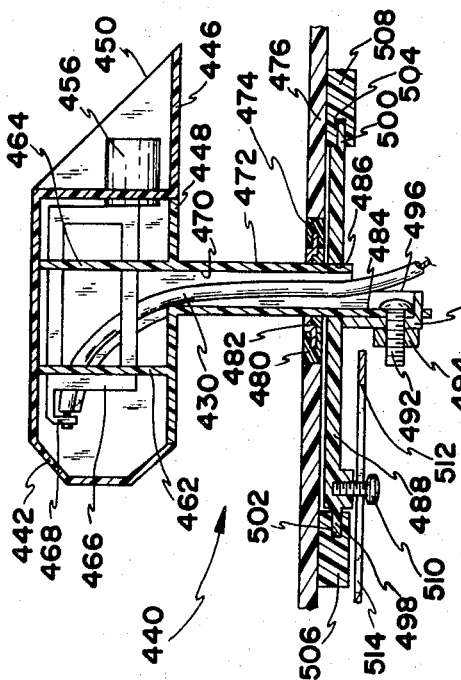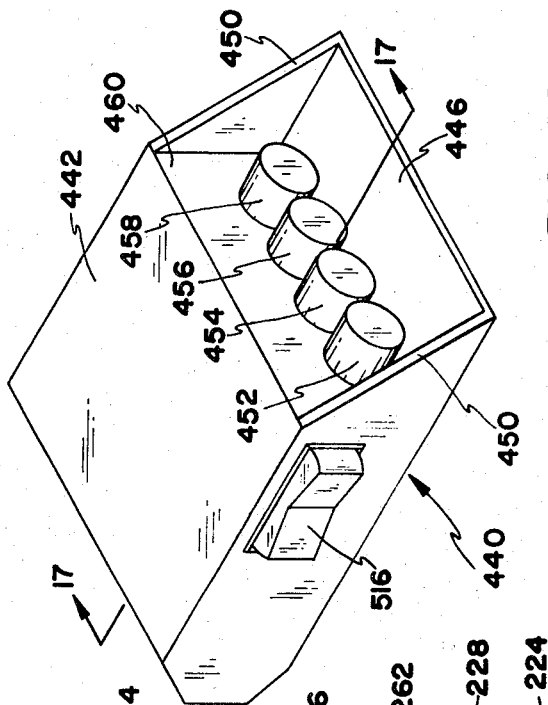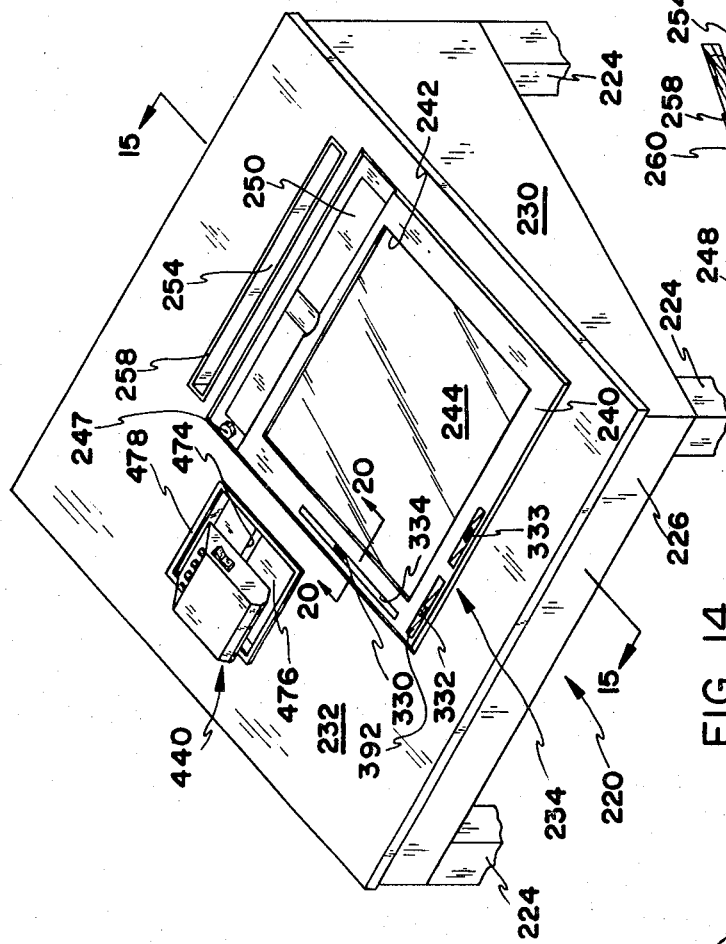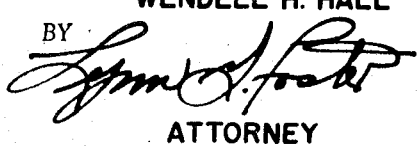

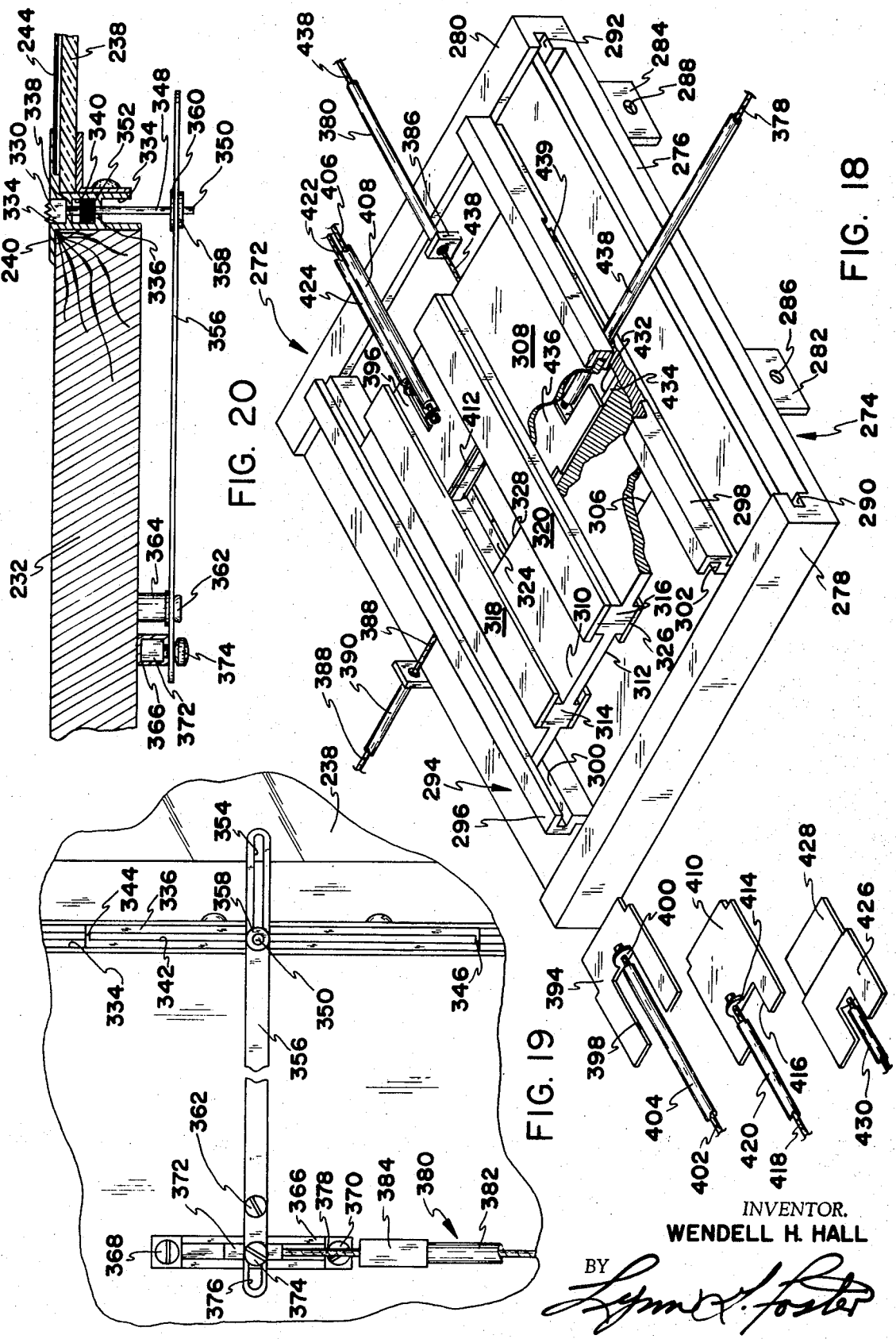

3,680,224

TEACHING SYSTEM

BACKGROUND

1. Field of the Invention

The invention relates to teaching systems including apparatus and methods and more particularly to apparatus and method for allowing a student to respond to audio and visual instruction.

2. The Prior Art

Teaching devices known to me generally include structure for presenting selected questions or information whereupon the student is required to write an answer or response upon a separate piece of paper. Normally, the student does not have opportunity to have his answer or response evaluated until after an extended period of time has passed. Frequently, this allows the student to forget at least some of the information and, thereby, lose the significance of the information. The difficulty of recall makes the described teaching tool less effective.

A more effective way of teaching is to visually or audibly communicate information to a student and allow the student to respond to the information. Then, an immediate evaluation of the response is effective to reinforce the correct response in the mind of the student.

BRIEF SUMMARY AND OBJECTS OF THE INVENTION

According to the present invention, information is communicated to a student either visually or audibly so that the student has opportunity to respond. After the response, comment or evaluation of the response is immediately available to the student.

It is a primary object of the present invention to provide novel apparatus and methods for teaching students.

It is another valuable object of the present invention to provide improved teaching apparatus which accommodates immediate evaluation of student response after the response has been formulated by the student.

These and other objects and features of the present invention will become more fully apparent from the following description and appended claims taken in conjunction with the accompanying drawings wherein:

BRIEF DESCRIPTION OF THE DRAWINGS

FIG. 2 is a plan view of the movable lamp assembly of FIG. 1 with the upper portion of the apparatus removed for ease of illustration;

FIG. 3 is a cover plate used with the embodiment of FIG. 2;

FIG. 4 is a longitudinal cross section taken along lines 4—4 of FIG. 2;

FIGS. 5–7 are schematic illustrations of other presently preferred embodiments of the invention;

FIG. 14 is still another presently preferred embodiment of the invention shown in perspective;

FIG. 15 is a longitudinal cross section taken along lines 15—15 of FIG. 14;

FIG. 16 is a perspective view of the control unit of FIG. 14;

FIG. 17 is a cross section taken along lines 17—17 of FIG. 16;

FIG. 18 is a fragmentary perspective view of the shutter and diaphragm assembly of FIG. 14, parts being broken away to reveal otherwise concealed elements;

FIG. 19 is a bottom plan view of the writing surface of FIG. 14 illustrating control linkage for the shutter and diaphragm assembly of FIG. 18; and FIG. 20 is a transverse cross section taken along lines 20—20 of FIG. 14.

DETAILED DESCRIPTION OF THE PREFERRED EMBODIMENTS

Referring to the Figures, throughout this specification like parts are designated with like numerals.

The Embodiment of FIGS. 1–7

Figure 1:
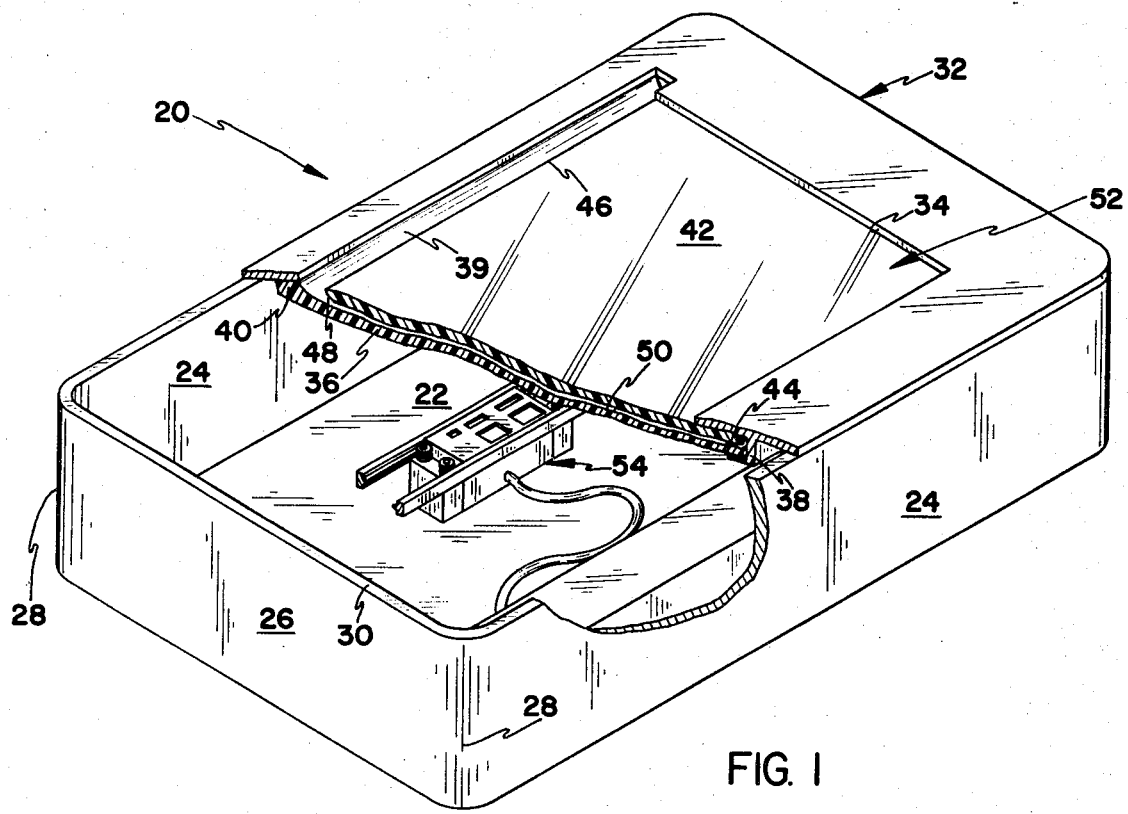
FIG. 1 is a schematic perspective of one presently preferred embodiment of the invention with parts broken away to reveal inner portions of the apparatus.

Referring particularly to FIG. 1, the teaching display apparatus, generally designated 20, includes a base 22 preferably formed of rigid structural material such as metal or plastic and has integral upstanding sides 24 and ends 26. The sides and ends 24 and 26, respectively, are joined together by rounded corners 28 and present a substantially smooth upper edge 30.

A frame 32 is carried upon the edge 30, frame 32 presenting a border 34 around the periphery of the open end of the base 22. The frame 32 has a generally square opening 34. Preferably, the frame is attached to the base 22 so that the frame is immovable when disposed upon the base but can be selectively moved from the base to accommodate access to the interior of the base as will be subsequently more fully described.

Frame 32 carries a plate or sheet of light-transmitting material 36, which may be glass or plastic or the like in a substantially horizontal plane spaced somewhat below the upper surface of the frame 32. The plate 36 may be bonded or otherwise rigidly secured to the frame 32 and, as illustrated in FIG. 1, may be carried within a downwardly projecting bracket 38 integral with the frame 32. The plate 36 may be translucent or transparent and preferably has an upper face which is inwardly contoured as at 39 adjacent the top edge 40 of the plate.

An upper plate 42 is likewise carried by the frame 32 within the opening 34. Preferably, plate 42 is adapted to erasably receive markings from a wax-bore pencil, felt-tipped pen or the like. The upper plate 42 is preferably formed of transparent material, such as plastic or glass, and is nominally spaced above the lower plate 36. The spacing is maintained by an outwardly projecting rib 44 carried by the bracket 38. Significantly, the plate 42 is united with the frame 32 on three sides and terminates in a rounded edge 46 which is laterally spaced from the contoured edge of the lower plate 36. Thus, an elongated opening 48 communicates the space 50 between the plates 42 and 36 with the exterior. The plates 42, 36 and frame 32 comprise a display panel generally designated 52 which serves a function hereinafter more fully described.

Interiorly, the base 22 is provided with a movable lamp assembly generally designated 54 and best illustrated in FIGS. 2 and 4. Referring now to FIG. 2, the lamp assembly 54 is a box 56 which is divided by partitions 58 into compartments 60. Although any desired number of compartments could be formed, there are five compartments in the illustrated embodiment. A lamp socket 62 is rigidly mounted in each compartment 60 and each socket 62 is connected by an electricity-conducting wire 64 to a power input cord 66. Each socket is coupled in a conventional way to a lamp 63. The box 56 is preferably fitted with cover 128 (FIG. 3) formed of opaque material. Cover 128 has a plurality of spaced apertures 130, 132, 134, 136 and 138. Each aperture is disposed over a separate compartment 60 so that when the lamp in the compartment is illuminated, light will project through the corresponding aperture. The apertures have a variety of configuration so that light projecting from the apertures will illuminate areas of predetermined size and shape on the plates 36 and 42. For example, apertures 130 and 132 form rectangular areas of light on plates 36 and 42 when the corresponding lamps are illuminated. Apertures 134 and 136 form lines of light on the plates 36 and 42 and aperture 138 forms a point of light. The method using the various illumination configurations will be hereinafter more fully described.

The box 56 is provided with a rotatable pulley wheel 68 at each corner, each pulley wheel being rotatably mounted upon a pin 70 (FIG. 4). Each pulley wheel extends laterally beyond the outside edge of the box 56. The pulley wheels 68 engage opposed flanges 72 integrally joined to parallel tracks 74. Thus, the lamp assembly 54 can be easily laterally displaced to and fro along the tracks 74.

One end 76 of the box 56 is connected to one end of a cord 78 and the other end 80 of the box 56 is connected to the opposite end of the cord 78. Cord 78 traverses around a large pulley wheel 82, best shown in FIG. 4 and subsequently more fully described. With continued reference to FIG. 2, the cord 78 is guided by pin 84 and pulley 86 so as to traverse a path parallel to and spaced from the box 54. The cord 78 is also disposed over pulley 88. Pulleys 86 and 88 and pin 84 allows the cord 78 to be axially displaced. Thus, when the pulley wheel 82 (FIG. 4) is rotated, the cord 78 will be displaced to draw the light assembly 54 in one direction or other, depending upon the direction of rotation.

Having described how the lamp assembly 54 moves back and forth laterally, the structure illustrating how the lamp assembly 54 is displaced back and forth normal to the previously described movement will now be described. With continued reference to FIG. 2, the tracks 74 are rigidly attached at one end to a bracket 90 and at the other end to a plate 92. The plate 92 is generally U-shaped in longitudinal cross-section, the sides of the U each being provided with generally opposed laterally extending flanges 94. A pulley 96 is mounted rotatably upon each flange 94 adjacent corresponding corners of the plate 92. As best shown in FIG. 4, pulleys 96 engage opposed outwardly projecting ribs 98 integrally depending from a control panel 100.

The control panel 100 is situated adjacent one side 26 of the base 22 and is rigidly mounted thereupon. The control panel 100 abuts the frame 32 carrying plates 36 and 42. Control panel 100 has a longitudinal slot 102, illustrated schematically in FIG. 5.

The plate 92 is connected to a control knob generally designated 104 by a hollow shaft 106 disposed through the slot 102. The shaft 106 is rigidly secured within a through bore in downwardly projecting boss 108 comprising part of the plate 92. Shaft 106 is integral with a knob housing 107 which is substantially diametrally enlarged and is disposed above the control panel 100 exterior of the base 22. Switches 154, 155, 156, 157 and 158 are mounted within the knob housing 107 and are interposed between a power source (not shown) and the power input cord 66 so as to control the operational state of corresponding lamps 63.

Shaft 106 is provided with a jacket 110 which circumscribes the shaft 106 and also the knob housing 107. Significantly, the jacket 110 is rotatable relative to the housing 107 and the shaft 106 and is non-rotatably attached to the pulley wheel 82. Thus, rotation of the jacket 110 exterior of the base 22 causes the pulley wheel 82 to rotate, thereby laterally displacing the lamp assembly 54.

Displacement of the lamp assembly 54 in a direction essentially normal to the above described lateral displacement is accommodated by exerting a lateral force upon the jacket 110 in the direction of slot 102. The mentioned force causes the plate 92 to be displaced along the opposed ribs 98 in the direction of the slot 102. Similarly, the bracket 90 (FIGS. 2 and 4) is supported upon the outwardly projecting rib 112 carried by the side 26 of the base 22 (FIG. 4). The bracket 90 is mounted upon the rib 112 with a pulley 114, the pulley 114 being rotatably carried upon the bracket 90. Thus, lateral movement of the knob assembly 104 causes concurrent lateral displacement of the lamp assembly 54.

Other presently preferred ways of laterally displacing the lamp assembly 54 are schematically illustrated in FIGS. 6 and 7. For example, referring to FIG. 6, a knob assembly 116 may be used, the knob assembly 116 having a push rod 118 which displaces the lamp assembly 54 in one direction while rotation of the knob 120 displaces the lamp assembly in the opposite direction. Still another desirable way of displacing the lamp assembly 54 is illustrated schematically in FIG. 7. In FIG. 7, a knob assembly 120 comprises a center knob 124 and a circumscribing exterior knob 126, knob 126 having an axial dimension which is substantially less than the axial dimension of knob 124. When the interior knob 124 is rotated, the lamp assembly 154 will be displaced along one axis and when the knob 126 is rotated, the lamp assembly 54 will be displaced along a perpendicular axis.

It is presently preferred that a stationary lamp (not shown) be mounted upon one end 26 of the base 22 adjacent the plate 36. Thus, when the stationary lamp is energized, all of the area of plates 36 and 42 will be illuminated.

Figure 8:
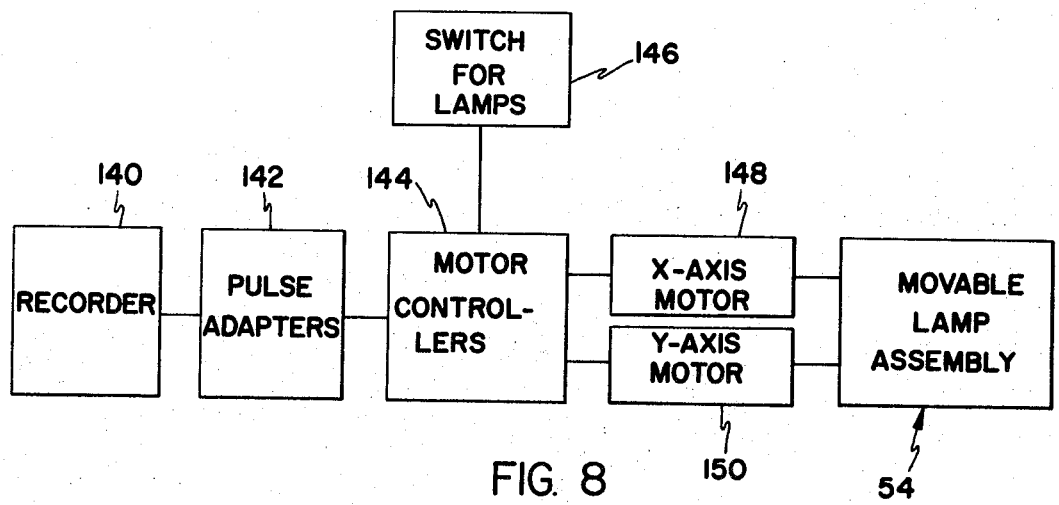
FIG. 8 is a schematic block diagram illustrating the electronic component parts of the apparatus.

The Embodiment of FIG. 8

If desired, an automatic control system for displacing the light assembly 54 may be carried within the base 22. The apparatus necessary for automatic control of the lamp assembly 54 is schematically illustrated in FIG. 8. In this embodiment, a recorder such as a conventional tape recorder 140 may be used to give directions to a student using the apparatus 20 and also may be used to initiate control pulses for displacing the lamp assembly 54. Although any suitable recording apparatus could be used, the Allied model 1150 solid state tape cassette recorder has been found satisfactory. The Allied recorder operates from either battery or conventional A.C. electrical energy.

As the tape recorder plays back instructions and directions to the student, selected tones are emitted from the recorder which are picked up by the pulse adapters 142. The pulse adapters are commercially available and are primarily necessary to adjust imprecise pulses developed by inexpensive recording equipment to the precise pulse requirements of stepping control motors 144. Motor controllers 144 continuously monitor the position of the movable lamp assembly 54 and also, in cooperation with the pulse adapters 142, energize the switching mechanism 146 for the lamps in the assembly 54. The switching mechanism is responsive to the type or number of pulses transferred by the pulse adapters 142. For example, each lamp can be triggered by a specific tone and a plurality of lamps may be energized by the switch mechanism 146 when the corresponding tones are sequentially transferred by the recorder 140 to the pulse adapters 142.

The motor controllers 144 selective actuate stepping motors 148 and 150 which in turn drive the movable lamp assembly 54 in either direction along the X axis and in either direction along the Y axis. The stepping motors and motor controllers are conventional commercially-available apparatus, a suitable type of each being obtainable from Automation Development Company of Culver City, California.

The Method of the FIG. 1-8 Embodiments

The present invention may be used as a teaching system for a wide variety of subjects and may be also used for an educational entertainment game. It has been found that the development is particularly useful in teaching foreign languages to students. The normal language teaching sequence employed with the present invention consists of five steps, including (1) familiarization (initial presentation, inductive or deductive), (2) assimilation (drills and exercises), (3) application (functional use, games, and the like), (4) control (examination and testing), and (5) continued use (systematic review). As can be appreciated by the above description, the movable lamp assembly forms a point of light, lines of light and/or blocks of light.

The point of light is, importantly, used as an index point for visually observing the location of the movable lamp assembly 54 relative to the plate 42. When a template 152 has been properly positioned in the space 50, the point of light may be used to correctly position the lamp assembly relative to the template prior to the generation of lines of light or blocks of light.

The point of light is also particularly valuable for aspects of familiarization in the teaching sequence. For example, a cartoon or photo sequence carried by a template and visually observable through the plate 42 may be used in the teaching method. A question or statement relating to the cartoon is visually observable on the face of the template. Upon reading the statement, the student attempts to select the part of the drawing which best relates to the statement. Having selected the part of the drawing, he positions the point of light at the selected location. If the student is accurate, an indication of the accuracy of the selection (which indication has been previously inscribed on the reverse side of the template) becomes visually observable at the point of light. Therefore, the student is made immediately aware of the accuracy of his statement. In a similar manner, true-false, multiple-choice and matching exercises and the like are quickly confirmed using the point of light.

When desired, lamps 62 may be illuminated so that light projects through the apertures 136 and 134 (FIG. 3) to form a line of light. Once the line of light has been formed, the student can vertically displace the line of light by manually displacing knob 104, or the line of light can be automatically displaced in response to a tone from the recorder as described with the FIG. 8 embodiment.

The line of light makes possible confirmation of reading comprehension and improving reading skills. For example, a statement in foreign language may be observable on the template and the translation thereof inscribed on the reverse side of the template. When the student has interpreted the statement, the proper interpretation can be immediately confirmed by displacing the line of light immediately beneath the foreign language statement thereby making a proper interpretation readily visibly available to the student. Similarly, it is possible to immediately check the accuracy of a dictated statement and also serves for immediate confirmation of answers to written or oral questions. Clearly, numerous other types of drills are possible with the line of light.

The block of light formed by projecting light through either or both of the apertures 130 and 132 (FIG. 3) may be used in a manner similar to that described for the line of light. Also, the blocks of light are particularly useful in connection with illustrations, charts, graphs, diagrams and the like. For example, graphs may be used in language teaching to show the relative standing of one country to another in agriculture, industry and the like. In response to specific questions relating to graphs and diagrams on a template, a student may inscribe required information on plate 42 with a wax-base pencil, felt-tipped pen or the like. Thereafter, a block of light may be illuminated to cause a proper response to become visually observable upon the template.

It can be also appreciated that where desired, blocks of light, lines of light and points of light may be used in various combinations one with another for any one of a variety of template layouts for teaching.

FIGS. 9–12

In the use of the display apparatus 20, a template or overlay 152 is implemented in the teaching process. Various overlay or template configurations are illustrated in FIGS. 9–12. Preferably, the template is formed of translucent paper (Mead 80* enamel, for example), the illustrated embodiment having a dimension of 17 inches by 13 inches. Printed information, such as vocabulary, text, questions and answers and the like (not shown) may be inscribed in normal fashion on the face of the paper, and also in mirror image on the reverse side of the template. Thus, when the template is inserted in the space 50 between plates 36 and 42, the inscribed information on the reverse side is not visually observable.

When it is desired to observe selected portions of the inscribed information on the reverse side of the template, light is projected from the movable lamp assembly to the underside of the template thereby illuminating a portion of the inscribed information and making that portion visually observable to the student. Alternatively, if desired, the stationary lamp can be illuminated to reveal all of the inscribed information on the reverse side of the template.

Figure 9:
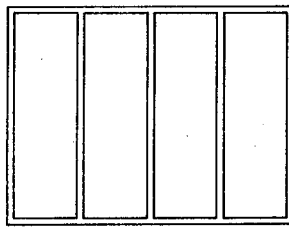
FIGS. 9–12 schematically illustrate presently preferred template embodiments usable with the illustrated embodiments of the invention.
Figure 12:
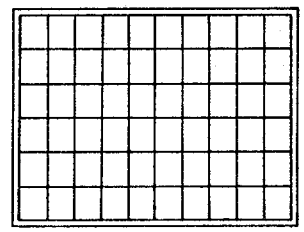
Figure 10:
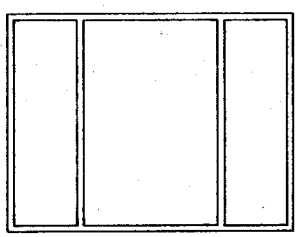
Figure 11:
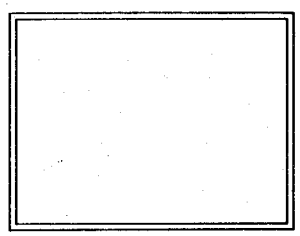

The printed information on the templates may be organized into vertical columns of print as shown in FIGS. 9 and 10 or, if desired, a "composite" illustration may be presented as shown schematically in FIG. 11 or smaller "discrete" illustrations as shown in FIG. 12, with accompanying symbols, letters, numbers, etc. The illustrated basic formats for the templates have been found most convenient and effective in teaching foreign languages to students. However, it can be appreciated that the template could be organized into any suitable geometric configuration of verbal messages and illustrations, printed by machine or written or drawn by hand.

FIG. 13

Figure 13:
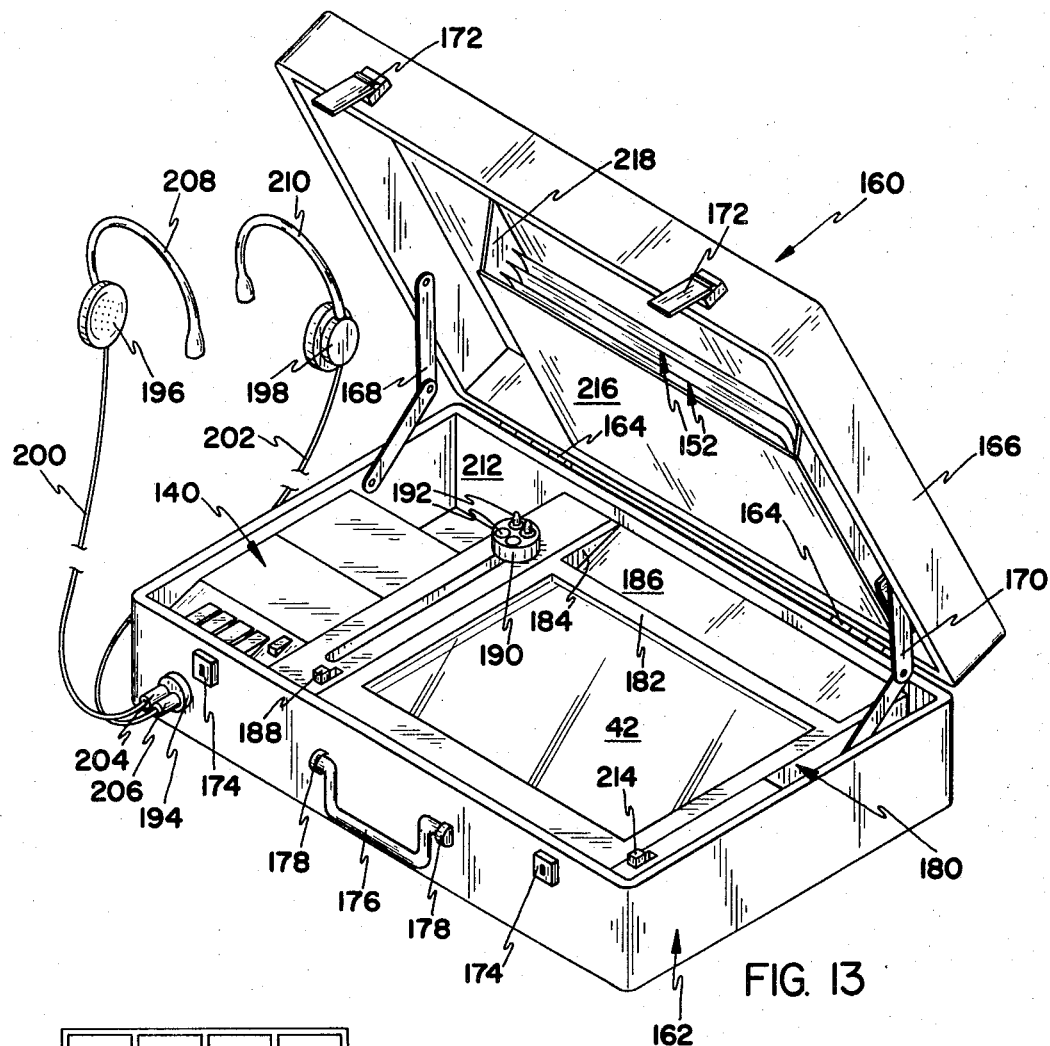
FIG. 13 is a perspective view of another presently preferred embodiment of the invention which is easily portable from place to place.

Reference is now made to FIG. 13 which illustrates an easily portable embodiment of the invention generally designated 160. The teaching unit 160 comprises a rectangular carrying case 162 which is connected by hinges 164 to a lid 166. The lid 166 has a size and configuration which matches the size and configuration of the case 162 and is pivotable about the hinges 164 from a closed position to a generally open position as illustrated in FIG. 13. Side braces 168 and 170 are pivotally connected between the lid 166 and case 162 so as to restrain the lid in the "open" position when desired.

The case is preferably provided with conventional spring latches 172 carried by the lid and mating latch sites 174 carried by the case 162. When latches 172 are properly closed upon the latch sites 174, the case will be locked in a closed condition. A handle 176 is pivotally carried within brackets 178 so that the case 162 may be easily transported from place to place.

Interior of the case, a display unit 180 is rigidly mounted. The display unit 180 is substantially similar to the display unit 20 illustrated in FIGS. 1–4. The display unit 180 differs from the display 20 in that the upper plate 42 is surrounded on all sides by a rigid border 182 of plastic material and the space between plate 42 and plate 36 (not shown in FIG. 13) opens into a trough 184. A ramp surface 186 borders the trough 184 so that templates 152 can be easily inserted into the space under plate 42 by guiding the templates over the ramp surface 186.

The display unit 180 has a double pole-double throw switch 188 which connects power into the unit 180 and, at the same time, illuminates an "index light" in the lamp assembly. The control knob 190 and switches 192 are then used to adjust the position and sequence of illumination of the movable lamp assembly 54 (see FIGS. 2 and 4). The recorder 140, described above with FIG. 8, is disposed in the case 162 alongside the display unit 180. The recorder 140 has an outlet jack 194. Head phones 196 and 198 are connected by wires 200 and 202, respectively, and male plugs 204 and 206 to the outlet jack 194. The head phones 196 and 198 have curved head bands 208 and 210, respectively, for allowing the head phones to be comfortably carried upon the head, as is conventional.

When desired, the plugs 204 and 206 can be uncoupled from the jack 194 so that the head phones 196 and 198 may be nested within compartment 212 in the case 162. Also, a switch 214 located along the right-hand edge of the case 162 (as viewed in FIG. 13) can be used to allow a team of two students to work together in the teaching process. The separate head phones 196 and 198 allow each student to receive instructions from the recorder 140 and, at the same time, allow each student to discuss with the other the subject matter of the information. Switch 214, when actuated, determines whether a single head phone or both head phones are electrically connected into the recorder 140.

A receptacle 216 is mounted upon the lid 166 so as to be confined within the case 162 when the lid is in the closed condition. The receptacle 216 has an opening 218 directed toward the upper edge of the case lid 166 when the lid is in the illustrated position. Receptacle 216 carries a plurality of templates 152 conveniently within the case 162 so that the templates 152 are readily accessable Thus, the embodiment illustrated in FIG. 13 is particularly advantageous because it is compact and completely portable from place to place.

The Method

The method of using the teaching unit 160 is similar to the method above described with relation to the embodiments of FIGS. 1–8. However, the teaching unit 160 advantageously accommodates the cooperative activity of at least two students comprising a team. Each of two students places one of the head phones 196 and 198 upon his head and inserts a tape in the recorder 140. The students may then work together in making functional use of skills and knowledge acquired in the foreign language. Notably, the single unit head phones allow one ear to be free so that the students can communicate one with another. If desired, the switch 214 may be actuated to make the recorded information on tape available to either one of the two students, exclusively, or to both students simultaneously according to the type of instruction desired.

Graphic materials employed on templates may provide controlled, systematic cues for speech production or conversation and the recordings serve to prompt and guide students in their responses until they are able to communicate unassisted with sufficient ability and confidence. Visual stimuli carried by the templates may be used in conjunction with the audio stimuli from the recorder 140 and students may verify their responses and answers by adjusting the location of the light source relative to the template with knob 190.

FIGS. 14–20

Reference is now made particularly to FIGS. 14 and 15 which illustrate still another presently preferred embodiment of the invention mounted in a table or carrel generally designated 220. As illustrated in FIG. 15, the carrel comprises a base member 222 which is supported upon legs 224. Base 222 supports front wall 226 and rear wall 228, wall 228 having a greater height than wall 226. Sides 230 cooperate with walls 226 and 228 to support the sloping writing surface 232. The surface 232 may be rigidly mounted upon the walls 226 and 228 or, alternatively, may be hingedly connected to the wall 228 so that access to the interior of the carrel 220 is made possible by lifting the front edge of the surface 232. Also, if desired, a storage drawer or the like (not shown) could be formed in the carrel 220.

A display unit generally designated 234 is mounted in a rectangular aperture 236 in the surface 232. The display unit 234 resembles the display unit 20 illustrated in FIG. 1 but differs from the display unit 20 in several respects.

A translucent or transparent plate 238 is mounted in the aperture 236 so as to be flush with the writing surface 232. A rectangular frame 240 formed of lightweight metal, plastic or the like is superimposed over the plate 238 and is slightly larger in outside diametral dimension so that the joint between the plate 238 and the surface 232 is obscured from view. The frame 240 has a generally centrally disposed rectangular opening 242 in which is mounted a transparent writing plate 244. The plate 244 is separated from the plate 238 so as to form a space 246 therebetween (see FIG. 15).

Space 246 opens to the exterior through an elongated slot 248 which opens parallel to guide way 250 carried by the frame 240. The guide way 250 has a contoured recess 252 which facilitates insertion and removal of templates 152 (FIG. 9) in space 246. Thus, a template may be disposed in the space 246 by guiding the template along the guide way 250 through the elongated slot 248.

Templates not in use may be placed in receptacle 254. Receptacle 254 is elongated and generally trough-shaped and is disposed within an elongated opening 256 in the surface 232. A peripheral lip 258 extends laterally from the receptacle 254 so as to prevent the receptacle from falling completely through the surface 232. Also, receptacle 254 has an opening 260 which is angularly oriented so as to be parallel with the slope of the surface 232.

With reference particularly to FIG. 15, the light source of the display unit 243 includes a conventional light projector 262 which is rigidly mounted upon platform 264 integral with the rear wall 228. Although any suitable projector could be used, an AC/DC projector of the type manufactured by T.M. Visual Industries, Inc., or the model V-1 manufactured by Viewlex, Inc., of Holbrook, New York has been found satisfactory. The projector 262 projects a light beam 266 forward, the light being incident upon a reflective surface 268 such as a mirror. The mirror 268 is joined to the rear wall 228 and is angularly related to the rear wall 228 so as to direct the beam 226 to a second reflective surface or mirror 270 mounted upon the base member 222. Light beam 266 is again reflected by mirror 270 to plate 238.

Because the light source 262 and mirrors 268 and 270 are fixed in space, the pencil of light directed upon plate 238 can be moved from place to place by changing the location at which the light is emitted from the projector 262 with a diaphragm and shutter assembly generally designed 272 (FIG. 18) as will now be more fully described.

Referring more particularly to FIG. 18, the shutter assembly 272 is shown in fragmentary perspective. Shutter assembly 272 comprises a base plate 274 which is generally U-shaped in configuration, having a horizontal member 276 and upstanding sides 278 and 280. Downwardly projecting tabs 282 and 284 are respectively provided with bores 286 and 288. The base plate 274 is situated at the objective diaphragm of projector 262 (in place of the usual slide carrier) as shown in FIG. 15 and is bolted on the projector by screws (not shown) disposed through the bores 286 and 288 into the projector housing.

Base plate 274 has an elongated rectangular opening (not shown) essentially centrally located in the horizontal member 276. Also, each of the sides 278 and 280 are provided with longitudinally directed grooves or tracts 290 and 292, respectively. Carriage plate 294 is disposed loosely within the tracks 290 and 292 so that the carriage plate 294 can be laterally displaced horizontally relative to the projector 262 (FIG. 15) in a manner subsequently more fully described.

Spaced parallel tracks 296 and 298 are integral with the carriage plate 294, each of the tracks having opposed recesses 300 and 302. The carriage plate 294 has a rectangular aperture 306 centrally disposed between the tracks 296 and 298, aperture 306 normally being in full register with the opening (not shown) in the horizontal member 276 of the base plate 274.

A displaceable plate 308 is reciprocably carried within the tracks 300 and 302. Plate 308 has an upper way 310 and a lower way 312, the ways 310 and 312 being formed by parallel guides 314 and 316 which respectively project above and below the plate 308. Elongated strips 318 and 320 are rigidly mounted upon the guides 314 and 316 so as to partially close the way 310. Similarly, the strips 324 and 326 are integral with the guides 314 and 316 to partially close the way 312.

The diaphragm blades are positioned by finger-actuated tabs 330 and 332. Tab 330 is exposed within an elongated slot 334 in the frame 240 as shown in FIGS. 14 and 20. With reference particularly to FIG. 20, the slot 334 is interrupted by spaced partitions 336 and 338 which cooperate to form an elongated channel 340. As best shown in FIG. 19, the partition 336 includes an elongated slot 342 which terminates at ends 334 and 346. Partition 338 is provided with a similar slot in register with the slot 342.

Referring again to FIG. 20, the tab 334 has a depending shaft 348 which terminates in an end 350 below the sloping writing surface 232. A bearing 352 is mounted upon the shaft 348 and is disposed within a channel 340 so that the tab may be easily displaced to and fro within the slot 334. The end 350 of the shaft 348 is disposed through an elongated slot 354 (FIG. 19) in a lever bar 356. Opposed retainers 358 and 360 maintain the lever bar in proper location upon the shaft 348.

Lever bar 356 has an aperture (not shown) through which a pivot screw 362 is disposed. A cylindrical spacer 364 (FIG. 20) maintains the lever 356 at a properly spaced distance from the sloping surface 232 and allows the lever bar to pivot easily around the axis of the screw 362.

A slide channel 366, best shown in FIG. 19, is secured by screws 368 and 370 to the underside of surface 232 parallel to the slot 334. Channel 366 receives a slide block 372 conventionally formed of nylon or the like so as to slide loosely within the channel 366. Lever bar 356 is pivotly connected to slide block 372 with screw 374. An elongated slot 376 allows the slide block 372 to traverse essentially the entire length of channel 366 while the lever 356 pivots at the screw 362.

The slide block 372 is integrally connected to the core 378 of a generally flexible coaxial control cable 380. The cable sheath 382 is immovably connected to the underside of surface 332 with connecting block 384 so that as the slide block 372 is displaced within the channel 366, only the core 378 will be displaced by the block 372. As best shown in FIG. 18, the coaxial cable 438 is coupled to diaphragm blade 436. A connecting block (not indicated in FIG. 18) is mounted upon the carriage plate 308 and the core 378 is secured in the diaphragm blade 436. Thus, the diaphragm blade 436 can be displaced to vary the dimensions and shape of the aperture by laterally moving tab 330 along the slot 334. Movement of tab 330 causes the lever 356 to pivot at the screw 362 so that the block 372 and core 378 are displaced within channel 366 (FIG. 19). As the core 378 is displaced, the attached diaphragm blade 436 (FIG. 18) will also be displaced as above described.

While the diaphragm blade 436 is displaceable vertically, diaphragm blade 412 is displaceable horizontally when the core 406 of cable 408 (FIG. 18) is displaced by manipulation of tab 332 in slot 392 (FIG. 14) in a manner substantially similar to the displacement of core 378 above described.

Referring again to FIG. 18, the upper way 310 slidably receives opaque shutters 394 and 396, the shutters 394 and 396 each having an elongated notch 398 and an upwardly projecting ear 400 located at one side of the notch. The core 402 of a coaxial cable 404 is attached to the ear 400 of shutter 394. Similarly, the core 406 of coaxial control cable 408 is attached to the ear of shutter 396.

Shutters 394 and 396 are superimposed over diaphragm blades 410 and 412, respectively. Each of the diaphragm blades 410 and 412 is similar to the shutters 394 and 396 and each has an upstanding ear 414 disposed at the base of a rectangular notch 416 and located at the other side of the notch 416. It should be observed that notch 416 has a substantially smaller axial dimension than notch 398 so that each diaphragm blade can be displaced into aperture 328 independent of shutters 394 and 396. Also, the core 418 of a coaxial control cable 420 is attached to the ear of diaphragm blade 410. Similarly, the core 422 of coaxial control cable 424 is attached to the diaphragm blade 412.

Shutters 394 and 396 are respectively superimposed over diaphragm blades 410 and 412 so that each of the mentioned blades is independently displaceable within the way 310. The particular instantaneous position of the shutters and blades are determined by the coaxial cables.

The way 312 receives shutter 426 having a transparent, though color tinted, end 428. The tinted shutter 426 is in general vertical alignment with shutter 394 and diaphragm blade 410. Preferably, another tinted shutter (not shown) is interposed into the way 312 in general vertical alignment with the shutter 396. The position of shutter 426 is controlled by a coaxial cable 430 as will hereinafter be more fully described.

As can be appreciated by reference to FIG. 18, another way 432 intersects the lower way 312 essentially perpendicularly, the way 432 having tracks 434 upon which rides a diaphragm blade 436. Blade 436 is reciprocable within the way 432 upon the tracks 434 into and out of the aperture 328. The particular position of the blade 436 is determined by coaxial cable 438. Notably, the cable 438 is disposed in elongated slot 439 in track 298 so that lateral movement of plate 308 is not hindered by the cable.

The diaphragm blades cooperate to change the configuration of light beams emerging from the aperture 328. For example, the diaphragm blades 410 and 412 may be brought together to form a narrow shaft of light emitting from the aperture 328. For example, the diaphragm blades 410 and 412 may be brought together to form a narrow shaft of light emitting from the aperture 328. Also, if desired, the diaphragm blade 436 may be used with diaphragm blades 410 and 412 to reduce the light emerging from aperture 328 to a single dot. Alternatively, a rectangular light beam could be formed when the diaphragm blades 410 and 412 are in the completely retracted position outside of aperture 328 and the diaphragm blade 436 is interposed part way into the aperture 328.

The tinted shutters 426 are used to filter the light emerging through the aperture 328 so that a single light color emerges. The shutters are either completely open or completely closed, except for narrow "indexing" slits employed to indicate position and potential dimensions of projected light at any time, as shaped by the diaphragm blades. Translucent templates can be inscribed with information in a particular color, e.g., blue, together with information inscribed in one other color, e.g. black. Thereafter, when the template has been inserted properly into the display unit 234, the blue-tinted shutters 426 may be interposed in the aperture 328 so that only blue light emerges. The emerging blue light will make the blue (though not the black) inscriptions on the template invisible to the student until such time as it is desired to make the blue inscriptions visible, completing the partial prompt or cue presented in black.

A rectangular aperture 328 exists in the plate 308 between guides 314 and 316 central to the length of the ways 310 and 312. Aperture 328 is disposed in register with aperture 306 and the opening (not shown) in base plate 274. It can be appreciated that as the aperture 328 is displaced horizontally with carriage plate 294 and vertically with plate 308, the location at which light is emitted from projector 262 (FIG. 15) is correspondingly changed. The structure for and method of displacing the plate 308 and carriage plate 294 will now be described.

It is desirable to be able to control the position of aperture 328 at a location convenient to the display unit 234. Therefore, as shown best in FIG. 17, control unit 440 is provided for this purpose. The control unit 440 includes a housing 442 which has a forwardly projecting shelf 446 which is coextensive with the bottom end 448 of the housing. Downwardly tapering shields 450 converge from the top of housing 442 to the leading edge of shelf 446. Buttons 452, 454, 456 and 458 project out of the leading face 460 of the housing 442 immediately above the shelf 446. The shelf 446 and shields 450 protect the buttons 452, 454, 456 and 458 from inadvertent displacement.

As best illustrated in FIG. 17, the housing 442 includes a pair of vertical partitions 462 and 464, each of which includes a plurality of side-by-side vertically oriented guide slots (not shown) adapted to receive actuating plates 466, one actuating plate being attached to each of the buttons 452, 454, 456 and 458. Each of the actuating plates 466 is biased by a spring (not shown) toward the illustrated position with the buttons projecting outward and has a downwardly directed hook 468, to which is attached the core of a corresponding control cable. For example, each button 452, 454, 456 and 458 controls the position of a corresponding shutter (FIG. 18). Therefore, the actuating plate 466 attached to button 456 is connected to the core of control cable 430. Buttons 456 and 458 control tinted shutters 426 so that as buttons 456 and 458 are depressed, the shutters 426 will move out of the center of aperture 328 (FIG. 18) and when buttons 456 and 458 are released, the tinted shutters converge toward the center of aperture 328. In a similar manner, shutters 394 and 396 are respectively disposed into and out of aperture 328 (FIG. 18) by depressing and releasing buttons 452 and 454.

The control cables connected to actuating plates 466, such as cable 430 illustrated in FIG. 17, traverse through the hollow interior 470 of a downwardly projecting stem 472 integral with housing 442. The stem 472 is directed through an elongated slot 474 in carriage plate 476.

Carriage plate 476, also shown in FIG. 14, is disposed within a rectangular insert 478 (FIG. 14) mounted within an opening (not shown) in the surface 232. The carriage plate 476 is recessed a substantial distance into the insert 478 so that the bottom end 448 of housing 442 is only slightly above the surface 232. A track assembly 480 (FIG. 17) is mounted within the elongated slot 474 and an outwardly projecting runner 482, mounted upon the stem 472, glides along the track 480 so that the housing 442 is easily laterally displaced within slot 474. The trailing end 484 of the stem 472 is disposed within an aperture 486 in horizontal control plate 488. The horizontal control plate 488 has a downwardly depending bracket 490 into which the trailing end 484 of stem 472 is nested. A threaded bolt 492 and a mating nut 494 tightly secure the stem 472 to the bracket 490.

It is observed that the end 484 of stem 472 has a notch 496 which allows the control cables to pass out of the stem 472 beneath the surface 232 and to thereafter traverse to the location of the shutter and diaphragm assembly 272 (FIG. 18.) The horizontal control plate 488 has outwardly projecting ribs 498 and 500 which are smaller in transverse dimension than the remainder of the plate 488. Ribs 498 and 500 are respectively received by grooves 502 and 504 of elongated tracks 506 and 508. The tracks 506 and 508, which may be formed of nylon material, are rigidly mounted upon carriage plate 476 parallel to slot 474. Thus, a slight displacing force exerted upon the housing 442 will cause the runner 482 and stem 472 to be displaced along the slot 474 and the control plate 488 will be simultaneously guided along the tracks 506 and 508.

A screw 510 is threadedly secured to the control plate 488 and also passes through an elongated slot 512 in lever bar 514. It should be observed that lever bar 514 is substantially identical to lever bar 356 illustrated in FIG. 19. Moreover, lever bar 514 is pivotally coupled to a slide block (not shown) and to the core of control cable 390 (FIG. 18) so that as the housing 442 is displaced parallel to slot 474, aperture 328 (FIG. 18) is displaced horizontally with carriage plate 294.

It should also be noted that the carriage plate 476 is displaceably mounted within tracks (not shown) carried by the sloping surface 232 (FIG. 14) and oriented perpendicular to the direction of travel of tracks 506 and 508. Thus, a lateral force exerted upon the housing 442 in a direction perpendicular to the slot 474 will cause the entire carriage plate 476 to be displaced perpendicular to the direction of slot 474. Carriage plate 476 is connected to the core 438 of control cable 380, attached to carriage plate 308 (FIG. 18). Thus, the position of aperture 328 is controlled by the back and forth movement of carriage plates 476 and 488 (FIG. 17).

Electrical energy to the projector 262 (FIG. 15) is controlled by switch 247. Switch 516 may be a three-position rocker switch controlling the operation of a tape recorder, such as recorder 140, illustrated in FIG. 13, transmitting information to either of two students, exclusively, or to both at once.

From the foregoing, it can be appreciated that the particular location and shape of illumination incident upon the display unit 234 can be accurately controlled. The location on the writing plate 244 of the illumination is controlled by manipulating housing 442. The potential size and configuration of the illumination is determined by displacement of the tabs 330, 332 and 333 and actual illumination in the selected shape and dimensions is effected through operation of the shutters by actuation of the buttons 452, 454, 456 and 458.

If desired, the shutter and diaphragm blade assembly 272 may be used in conjunction with an audio component such as a tape recorder (not shown) which may be tape recorder 140 above described. Control pulses may be recorded on the same track as lesson material or, if desired, on separate tape tracks. When inexpensive recording equipment is employed, pulse adapters are utilized to adjust imprecise pulses to the input pulse requirements of stepping control motors (not shown) which provide switching logic required to effect clockwise and counter clockwise stepping of the motors in desired increments. The apparatus and method of operation of the automatic control may be substantially similar to that described in connection with FIG. 8, above. The rotary motion of the stepping motors is converted to whatever directional motion is necessary to adjust the shape, size and position of the aperture and to actuate the shutters. In an analogous way, additional tones on the tape recording may be coupled through an adapter to effect switching of the projector to the "on" and "off" position.

The Method Relating to FIGS. 14–20

The method of the FIGS. 14–20 embodiment is in many ways substantially similar to that described in connection with FIGS. 1–8, above. For example, a point of light may be formed by manipulating tabs 330, 332 and 333 so as to bring diaphragm blades 410, 412 and 436 well within the aperture 328 (FIG. 18), leaving only a narrow point of light projecting through the aperture.

Where a cartoon, photo sequence or the like is referred to for teaching purposes, a question or statement may be readily visible upon the template inserted in space 246 (FIG. 15.) Upon hearing or reading the statement, the student will attempt to select the part of the drawing or cartoon which best relates to the statement. Having made his choice, the point of light is positioned at the selected spot by manipulating housing 442. In one preferred embodiment of the invention, the tinted shutters 426 may be placed across the aperture 328 (FIG. 18) so as to make the point of light a single color. If indications inscribed on the back of the template are of the same color as the beam of light, only a partial confirmation of accuracy (printed in another color) will be available. Therefore, the total information inscribed on the back of the template (in two colors) is not visually available to the student until the precise moment in which the tinted shutters 426 are removed from the aperture 328 by manipulation of buttons 456 and 458.

When desired, the tinted shutters may be removed from the aperture 328 and all of the inscribed information on the back of the template becomes visually observable in the "white light" then projecting from the aperture 328. In a similar way, true-false, multiple-choice and matching exercises can be quickly confirmed by selectively displacing the tinted shutters 426 out of aperture 328.

The use of colored inscriptions in combination with tinted shutters makes possible many new instructional techniques. Students may be assisted in mastering instructional items by means of partial cues, prompts, hints and the like through selective use of the tinted shutters. Information on the reverse side of the template becomes visible when the tinted shutter is opened to allow white light to reveal the colored inscriptions on the template. Clearly, if desired, a plurality of tints could be used with a plurality of shutters. Also, inexpensive plastic spectacles may be used in conjunction with the materials printed and displayed by "white" light providing further instructional possibilities. For example, one student wearing spectacles of one color is unable to view information displayed in that color though it is visible to his teammate. Similarly, the one student may view material that is inaccessible to his teammate. Other information may be accessible to both students simultaneously.

In a manner similar to that described with regard to the point of light, a line of light and block of light may be used either individually or in combination to implement teaching techniques similar to those described in connection with the embodiment of FIGS. 1-8.

From the foregoing, it can be appreciated that a novel teaching system and method has been provided which makes available a wide variety of advanced teaching techniques.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore to be embraced therein.

What is claimed and desired to be secured by United States Letters Patent is:

1. A teaching apparatus comprising:
   light-transmitting base means;
   translucent means superimposable upon the base means for presenting inscribed information which is disposed on the reverse side thereof and is normally obscured from visual observations;
   stationary illuminating means associated with the presenting means for illuminating selected portions of the inscribed information to cause said information to be visible through said translucent means; and
   displaceable shutter means interposable between said illuminating means and said translucent means for determining the shape, dimensions and location of illumination emitted by the illuminating means.

2. Apparatus as defined in claim 1 further comprising tinted shutters selectively filtering the illumination emitted through the displaceable shutter means so that while the illumination is filtered, inscribed information on the superimposable means having the same color hue as the tinted shutters will be visually obscured, said tinted shutters being selectively displaceable to permit reading of said inscribed information.

3. A teaching apparatus comprising:
   a light-transmitting plate;
   a light-transmitting template disposed on said plate having indicia provided on both the front and rear surfaces of said template with the indicia on said rear surface being readable through said template upon illumination of the portion of said template bearing said indicia on said rear surface;
   a light source projecting a light beam to the light-transmitting plate;
   means for varying the configuration of the light beam; and
   means for varying the location of incidence of the light beam upon the plate.

4. A teaching apparatus as defined in claim 3 further comprising transparent means superimposed over and spaced from the light-transmitting plate, the transparent means erasably receiving indicia.

5. A teaching apparatus as defined in claim 3 wherein the light source is stationary and the first determining means comprises means interposed between said light source and said template defining an aperture through which light from the stationary source projects and a shutter assembly remotely controlled to vary the size and configuration of the aperture.

6. A teaching apparatus as defined in claim 5 wherein the second determining means comprises remotely controlled means for displacing the aperture defining means laterally relative to the stationary light source.

7. In a method of teaching a student, the steps of:
   communicating to the student information which suggests a response;
   illuminating a portion of a template so that a plurality of responses to the communicated information are visibly observable by the student while blocking illumination from other portions of the template so that information indicating the correct response is not visible;

causing the student to select at least one of said plurality of responses and to indicate the selected response;

thereafter illuminating said other portions of said template to render visible additional information relating to the correct response and to accommodate comparison of the selected response and the additional information; and causing the student to select an alternative one of said plurality of responses and to indicate the alternative response selected.

* * * * *